US012073758B2

(12) United States Patent
Lee

(10) Patent No.: US 12,073,758 B2
(45) Date of Patent: Aug. 27, 2024

(54) DISPLAY DEVICE AND METHOD OF DRIVING THE SAME

(71) Applicant: Samsung Display Co., Ltd., Yongin-Si (KR)

(72) Inventor: Kyung-Hun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/230,176

(22) Filed: Aug. 4, 2023

(65) Prior Publication Data

US 2024/0078953 A1 Mar. 7, 2024

(30) Foreign Application Priority Data

Sep. 6, 2022 (KR) ........................ 10-2022-0112766

(51) Int. Cl.
*G09G 3/20* (2006.01)
*G09G 3/32* (2016.01)
*G09G 3/3233* (2016.01)

(52) U.S. Cl.
CPC ......... *G09G 3/2044* (2013.01); *G09G 3/2077* (2013.01); *G09G 3/32* (2013.01); *G09G 3/3233* (2013.01); *G09G 2310/027* (2013.01); *G09G 2310/0272* (2013.01)

(58) Field of Classification Search
CPC ........... G09G 2330/021; G09G 3/3233; G09G 2360/16; G09G 3/2044; G09G 2320/0295; G09G 2320/029; G09G 3/32; G09G 3/2055; G09G 2320/0271; G09G 3/2059; G09G 2320/0673; G09G 3/2051
See application file for complete search history.

(56) References Cited

U.S. PATENT DOCUMENTS

2008/0158218 A1* 7/2008 Kim ..................... G09G 3/3225 345/212
2016/0140898 A1* 5/2016 Hyun .................. G09G 3/3233 345/694

FOREIGN PATENT DOCUMENTS

KR 10-0495792 B1 9/2005
KR 20220130302 A * 9/2022
KR 10-2022-0134806 A 10/2022

OTHER PUBLICATIONS

KR-20220130302-A (Year: 2022).*

* cited by examiner

*Primary Examiner* — Sanjiv D. Patel
(74) *Attorney, Agent, or Firm* — Innovation Counsel LLP

(57) ABSTRACT

A display device may include a pixel unit which includes pixels, a driver which drives the pixel unit based on image data, a voltage generator which provides a driving voltage to the pixel unit, and a global current manager including a compensation voltage generator which receives a comparison result between a sensing current of the pixel unit and a reference current range generated based on the image data from a comparator and generates a compensation voltage for controlling the driving voltage, and a compensation data generator which generates compensation data for controlling grayscale values of the image data in a dithering method based on the comparison result.

20 Claims, 13 Drawing Sheets

FIG. 4

| FRAME | N | N+10 | N+20 | N+30 |
|---|---|---|---|---|
| CPV | -a(V) | -a(V) | -a(V) | -a(V) |
| ELVDD | 24(V) | 24-a(V) | 24-2a(V) | 24-3a(V) |

DISPLAY DEVICE AND METHOD OF DRIVING THE SAME

CROSS-REFERENCE TO RELATED APPLICATION(S)

This application claims priority under 35 USC § 119 to Korean Patent Application No. 10-2022-0112766 filed on Sep. 6, 2022, in the Korean Intellectual Property Office (KIPO), the entire disclosure of which is incorporated by reference herein.

BACKGROUND

1. Field

Embodiments relate to a display device. More particularly, embodiments relate to a display device and a method of driving the display device.

2. Description of the Related Art

A display device may include pixels, and the pixels may emit light based on driving currents respectively flowing through the pixels. The sum of the driving currents may be defined as a global current of the display device, and the global current may be proportional to luminance of the display device. The global current may be controlled in order to keep the luminance of the display device constant.

The global current may be controlled by decreasing or increasing all grayscale values of image data. For example, the global current may be decreased by decreasing all grayscale values of the image data by 1 when a sensing current is greater than a reference current calculated based on the image data, and the global current may be increased by increasing all grayscale values of the image data by 1 when the sensing current is less than the reference current. However, when all grayscale values of the image data is decreased or increased, a change in luminance of the display device may increase, and accordingly, flicker may be recognized, and display quality of the display device may deteriorate.

SUMMARY

Embodiments provide a display device for improving display quality and a method of driving the display device.

A display device according to embodiments may include a pixel unit which includes pixels, a driver which drives the pixel unit based on image data, a voltage generator which provides a driving voltage to the pixel unit, and a global current manager including a compensation voltage generator which receives a comparison result between a sensing current of the pixel unit and a reference current range generated based on the image data from a comparator and generates a compensation voltage for controlling the driving voltage, and a compensation data generator which generates compensation data for controlling grayscale values of the image data in a dithering method based on the comparison result.

In an embodiment, the global current manager may generate the compensation voltage for decreasing the driving voltage or may generate the compensation data for decreasing the grayscale values of the image data in the dithering method when the sensing current is greater than a maximum reference current of the reference current range.

In an embodiment, the global current manager may generate the compensation voltage for decreasing the driving voltage when a sensing driving voltage of the pixel unit is greater than or equal to a minimum reference voltage generated based on the image data.

In an embodiment, the global current manager may generate the compensation data for maintaining the grayscale values of the image data when the sensing driving voltage is greater than or equal to the minimum reference voltage.

In an embodiment, the global current manager may generate the compensation data for decreasing the grayscale values of the image data in the dithering method when the sensing driving voltage is greater than or equal to the minimum reference voltage.

In an embodiment, the global current manager may generate the compensation data for decreasing the grayscale values of the image data in the dithering method when the sensing driving voltage is less than the minimum reference voltage.

In an embodiment, the global current manager may generate the compensation voltage for increasing the driving voltage when the sensing driving voltage is less than the minimum reference voltage.

In an embodiment, the global current manager may generate the compensation voltage for maintaining the driving voltage when the sensing driving voltage is less than the minimum reference voltage.

In an embodiment, the global current manager may generate the compensation data for increasing the grayscale values of the image data in the dithering method when the sensing current is less than a minimum reference current of the reference current range.

In an embodiment, the global current manager may generate the compensation data for controlling the grayscale values of the image data in the dithering method when an average of the grayscale values of the image data is greater than or equal to a preset reference grayscale. The global current manager may generate the compensation data for controlling the grayscale values of the image data in a non-dithering method when the average of the grayscale values of the image data is less than the reference grayscale.

A method of driving a display device according to embodiments may include generating a reference current range based on image data, sensing a sensing current of a pixel unit including pixels, comparing the sensing current and the reference current range, and controlling a driving voltage provided to the pixel unit based on a comparison result between the sensing current and the reference current range, or controlling grayscale values of the image data in a dithering method based on the comparison result.

In an embodiment, controlling the driving voltage or controlling the grayscale values of the image data in the dithering method may include decreasing the driving voltage or decreasing the grayscale values of the image data in the dithering method when the sensing current is greater than a maximum reference current of the reference current range.

In an embodiment, the method may further include generating a minimum reference voltage based on the image data, sensing a sensing driving voltage of the pixel unit, and comparing the sensing driving voltage and the minimum reference voltage. Controlling the driving voltage or controlling the grayscale values of the image data in the dithering method may include decreasing the driving voltage when the sensing driving voltage is greater than or equal to the minimum reference voltage.

In an embodiment, in decreasing the driving voltage, the grayscale values of the image data may be maintained.

In an embodiment, in decreasing the driving voltage, the grayscale values of the image data may be decreased in the dithering method.

In an embodiment, controlling the driving voltage or controlling the grayscale values of the image data in the dithering method may include decreasing the grayscale values of the image data in the dithering method when the sensing driving voltage is less than the minimum reference voltage.

In an embodiment, in decreasing the grayscale values of the image data in the dithering method, the driving voltage may be increased.

In an embodiment, in decreasing the grayscale values of the image data in the dithering method, the driving voltage may be maintained.

In an embodiment, controlling the driving voltage or controlling the grayscale values of the image data in the dithering method may include increasing the grayscale values of the image data in the dithering method when the sensing current is less than a minimum reference current of the reference current range.

In an embodiment, the method may further include comparing an average of the grayscale values of the image data and a preset reference grayscale. The grayscale values of the image data may be decreased in the dithering method when the average of the grayscale values of the image data is greater than or equal to the reference grayscale. The grayscale values of the image data may be decreased in a non-dithering method when the average of the grayscale values of the image data is less than the reference grayscale.

In the display device and the method of driving the display device according to the embodiments, a driving voltage may be decreased, or grayscale values of image data may be decreased or increased in a dithering method in order to control a global current, so that, in the process of controlling the global current, a change in luminance of the display device may be decreased. Accordingly, flicker may not be recognized, and display quality of the display device may be improved.

BRIEF DESCRIPTION OF THE DRAWINGS

Illustrative, non-limiting embodiments will be more clearly understood from the following detailed description taken in conjunction with the accompanying drawings.

FIG. 4 is a table for describing a compensation voltage and a driving voltage in frames according to an embodiment.

DETAILED DESCRIPTION OF THE EMBODIMENTS

Figure 1:
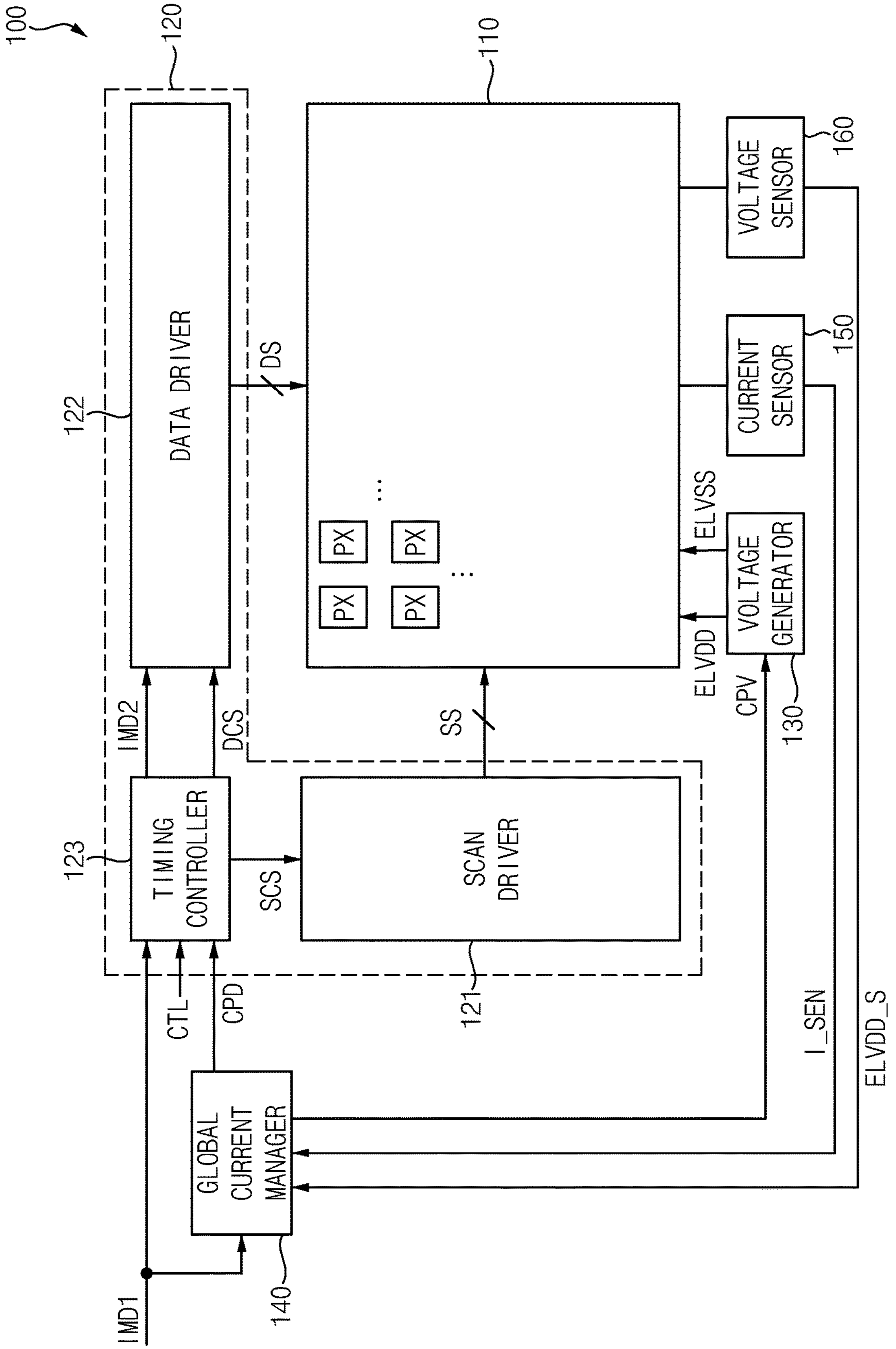
FIG. 1 is a block diagram illustrating a display device according to an embodiment.

Hereinafter, a display device and a method of driving a display device according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment.

Referring to FIG. 1, a display device 100 may include a pixel unit 110, a driver 120, a voltage generator 130, a global current manager 140, a current sensor 150, and a voltage sensor 160.

The pixel unit 110 may include a plurality of pixels PX arranged in a matrix configuration. In an embodiment, the pixels PX may include red pixels emitting red light, green pixels emitting green light, and blue pixels emitting blue light. The pixel unit 110 may be disposed in a display area of a display panel included in the display device 100.

The driver 120 may drive the pixel unit 110 based on image data IMD1. The driver 120 may include a scan driver 121, a data driver 122, and a timing controller 123.

The scan driver 121 may provide scan signals SS to the pixels PX. The scan driver 121 may generate the scan signals SS based on a first control signal SCS. The first control signal SCS may include a scan start signal, a scan clock signal, or the like. In an embodiment, the scan driver 121 may be disposed in a non-display area of the display panel.

The data driver 122 may provide data signals DS to the pixels PX. The data driver 122 may generate the data signals DS based on compensation image data IMD2 and a second control signal DCS. The compensation image data IMD2 may include grayscale values corresponding to the pixels PX. The second control signal DCS may include a data start signal, a data clock signal, a load signal, or the like. In an embodiment, the data driver 122 may be disposed in the non-display area of the display panel, or may be disposed on a printed circuit board connected to the display panel.

The timing controller 123 may control the operation of the scan driver 121 and the operation of the data driver 122. The timing controller 123 may generate the compensation image data IMD2, the first control signal GCS, and the second control signal DCS based on the image data IMD1 and a control signal CTL provided from the outside, and compensation data CPD provided from the global current manager 140. The image data IMD1 may include grayscale values corresponding to the pixels PX. The compensation data CPD may include compensation values corresponding to the pixels PX. The control signal CTL may include a clock signal, a vertical synchronizing signal, a horizontal synchronizing signal, or the like. In an embodiment, the timing controller 123 may be disposed in the non-display area of the display panel, or may be disposed on a printed circuit board connected to the display panel.

The voltage generator 130 may provide a driving voltage ELVDD and a common voltage ELVSS to the pixel unit 110. The voltage generator 130 may generate the driving voltage ELVDD based on a compensation voltage CPV provided from the global current manager 140. A voltage level of the driving voltage ELVDD may be higher than that of the common voltage ELVSS. In an embodiment, the voltage generator 130 may be disposed in the non-display area of the display panel, or may be disposed on a printed circuit board connected to the display panel.

The global current manager 140 may generate the compensation voltage CPV for controlling the driving voltage ELVDD based on a comparison result between a sensing current I_SEN of the pixel unit 110 and a reference current range generated based on the image data IMD1 and provide the compensation voltage CPV to the voltage generator 130, and may generate the compensation data CPD for controlling the grayscale values of the image data IMD1 in a dithering method and provide the compensation data CPD to the timing controller 123.

The voltage generator 130 may control the driving voltage ELVDD based on the compensation voltage CPV. In an embodiment, the voltage generator 130 may add the compensation voltage CPV to the driving voltage ELVDD.

The timing controller 123 may control the image data IMD1 based on the compensation data CPD. In an embodiment, the timing controller 123 may generate the compensation image data IMD2 by adding the compensation values of the compensation data CPD to the grayscale values of the image data IMD1.

The current sensor 150 may sense the sensing current I_SEN of each of pixels in the pixel unit 110. In an embodiment, the current sensor 150 may sense a current flowing through a driving voltage line transmitting the driving voltage ELVDD or a common voltage line transmitting the common voltage ELVSS as the sensing current I_SEN for each pixel. The sensing current I_SEN may be a global current that is the sum of driving currents respectively flowing through the pixels PX. The current sensor 150 may provide the sensing current I_SEN to the global current manager 140.

The voltage sensor 160 may sense a sensing driving voltage ELVDD_S of the pixel unit 110. In an embodiment, the voltage sensor 160 may sense a voltage of the driving voltage line as the sensing driving voltage ELVDD_S. The voltage sensor 160 may provide the sensing driving voltage ELVDD_S to the global current manager 140.

Figure 2:
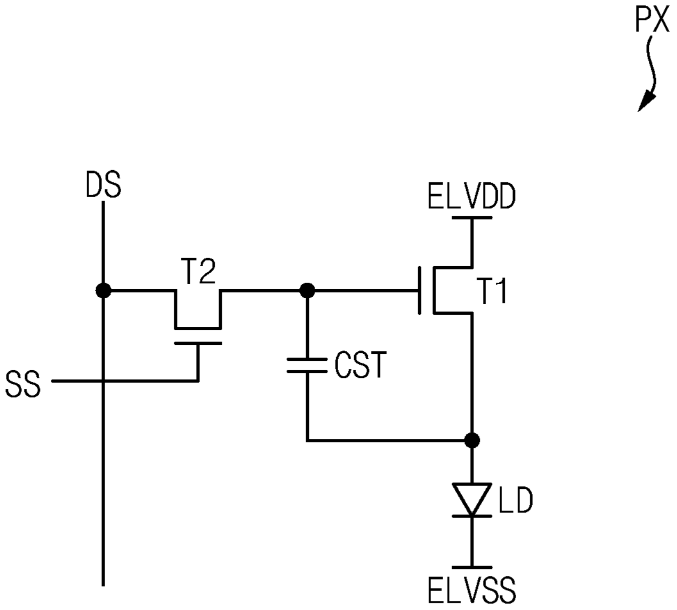
FIG. 2 is a circuit diagram illustrating a pixel according to an embodiment.

FIG. 2 is a circuit diagram illustrating a pixel PX according to an embodiment.

Referring to FIG. 2, the pixel PX may include a first transistor T1, a second transistor T2, a storage capacitor CST, and a light emitting diode LD.

The first transistor T1 may provide a driving current to the light emitting diode LD. A first electrode of the first transistor T1 may be connected to a driving voltage line transmitting the driving voltage ELVDD, and a second electrode of the first transistor T1 may be connected to a first electrode of the light emitting diode LD. A gate electrode of the first transistor T1 may be connected to a second electrode of the second transistor T2.

The second transistor T2 may provide the data signal DS to the gate electrode of the first transistor T1 in response to the scan signal SS. A first electrode of the second transistor T2 may be connected to a data line transmitting the data signal DS, and a second electrode of the second transistor T2 may be connected to the gate electrode of the first transistor T1. A gate electrode of the second transistor T2 may be connected to a scan line transmitting the scan signal SS.

FIG. 2 illustrates an embodiment in which each of the first transistor T1 and the second transistor T2 is an N-type transistor (e.g., an NMOS transistor), but the present disclosure is not limited thereto. In another embodiment, at least one of the first transistor T1 and the second transistor T2 may be a P-type transistor (e.g., a PMOS transistor).

The storage capacitor CST may maintain a voltage between the second electrode and the gate electrode of the first transistor T1. A first electrode of the storage capacitor CST may be connected to the gate electrode of the first transistor T1, and a second electrode of the storage capacitor CST may be connected to the second electrode of the first transistor T1.

FIG. 2 illustrates an embodiment in which the pixel PX includes two transistors and one capacitor, but the present disclosure is not limited thereto. In another embodiment, the pixel PX may include three or more transistors and/or two or more capacitors.

The light emitting diode LD may emit light based on the driving current. A first electrode of the light emitting diode LD may be connected to the second electrode of the first transistor T1, and a second electrode of the light emitting diode LD may be connected to a common voltage line transmitting the common voltage ELVSS. In an embodiment, the light emitting diode LD may be an organic light emitting diode. In another embodiment, the light emitting diode LD may be a quantum dot light emitting diode, an inorganic light emitting diode, or the like.

Figure 3:
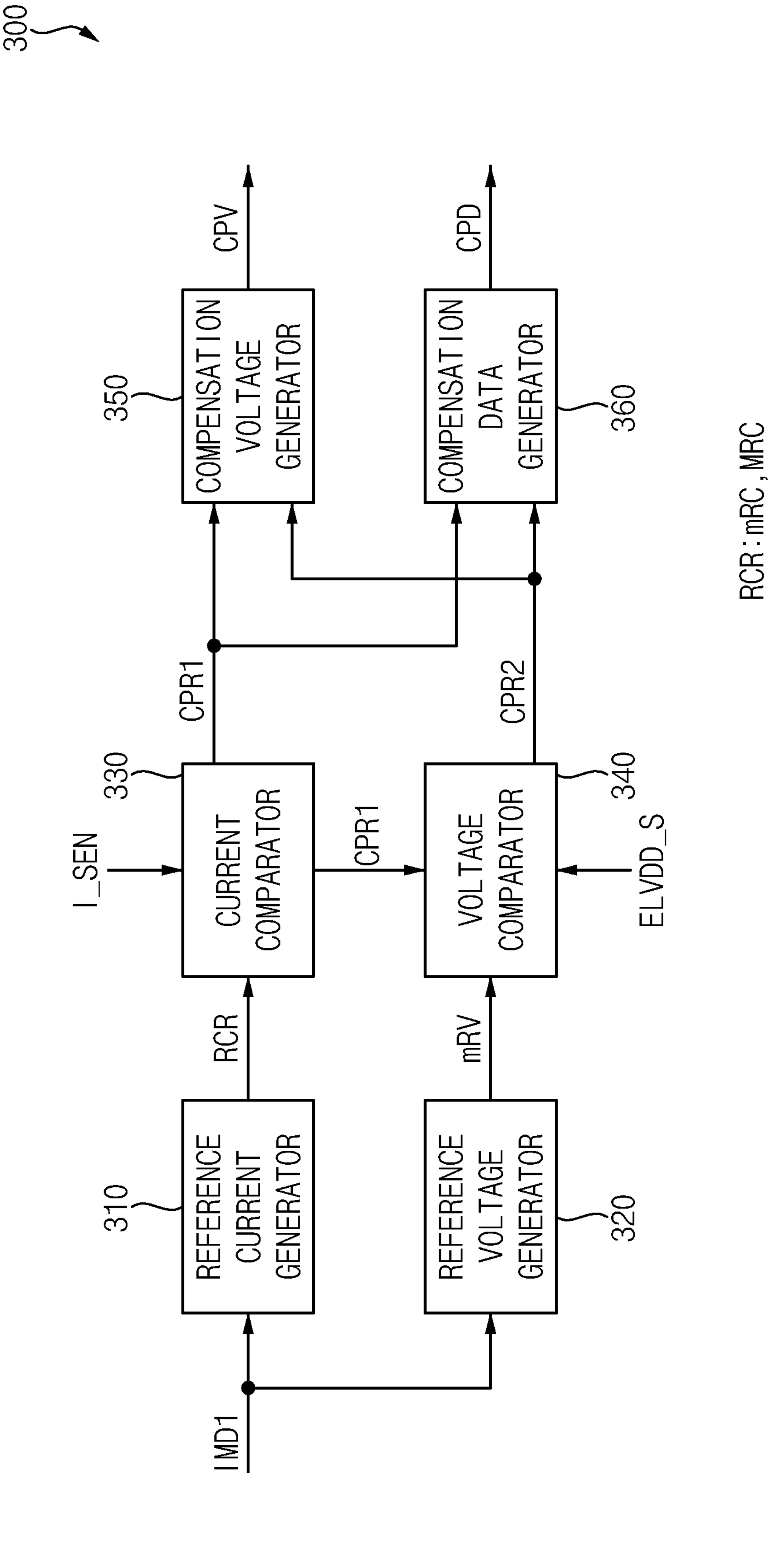
FIG. 3 is a block diagram illustrating a global current manager according to an embodiment.
Figure 5:
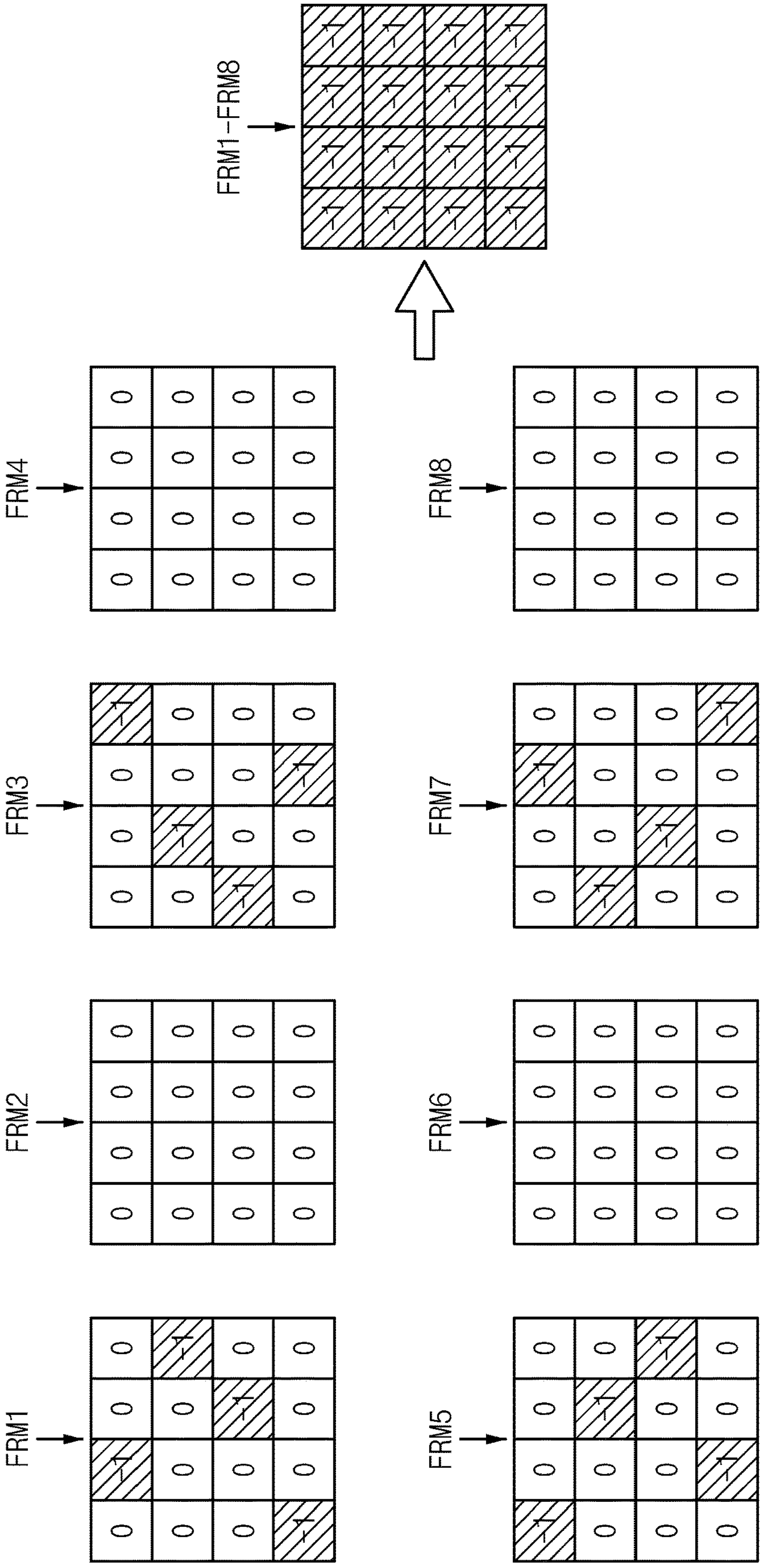
FIGS. 5, 6, 7, and 8 are diagrams for describing compensation data in frames according to embodiments.
Figure 6:
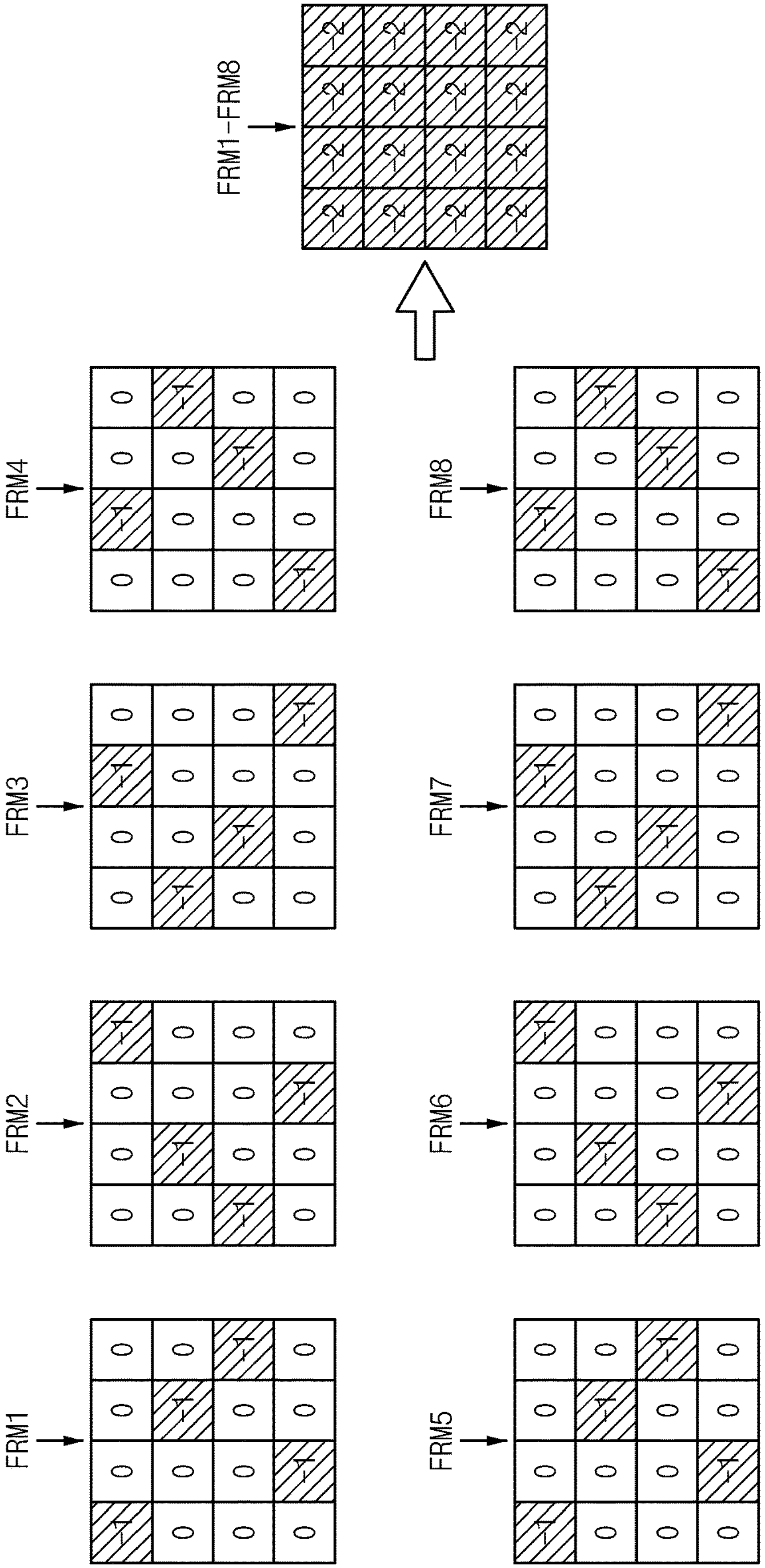
Figure 7:
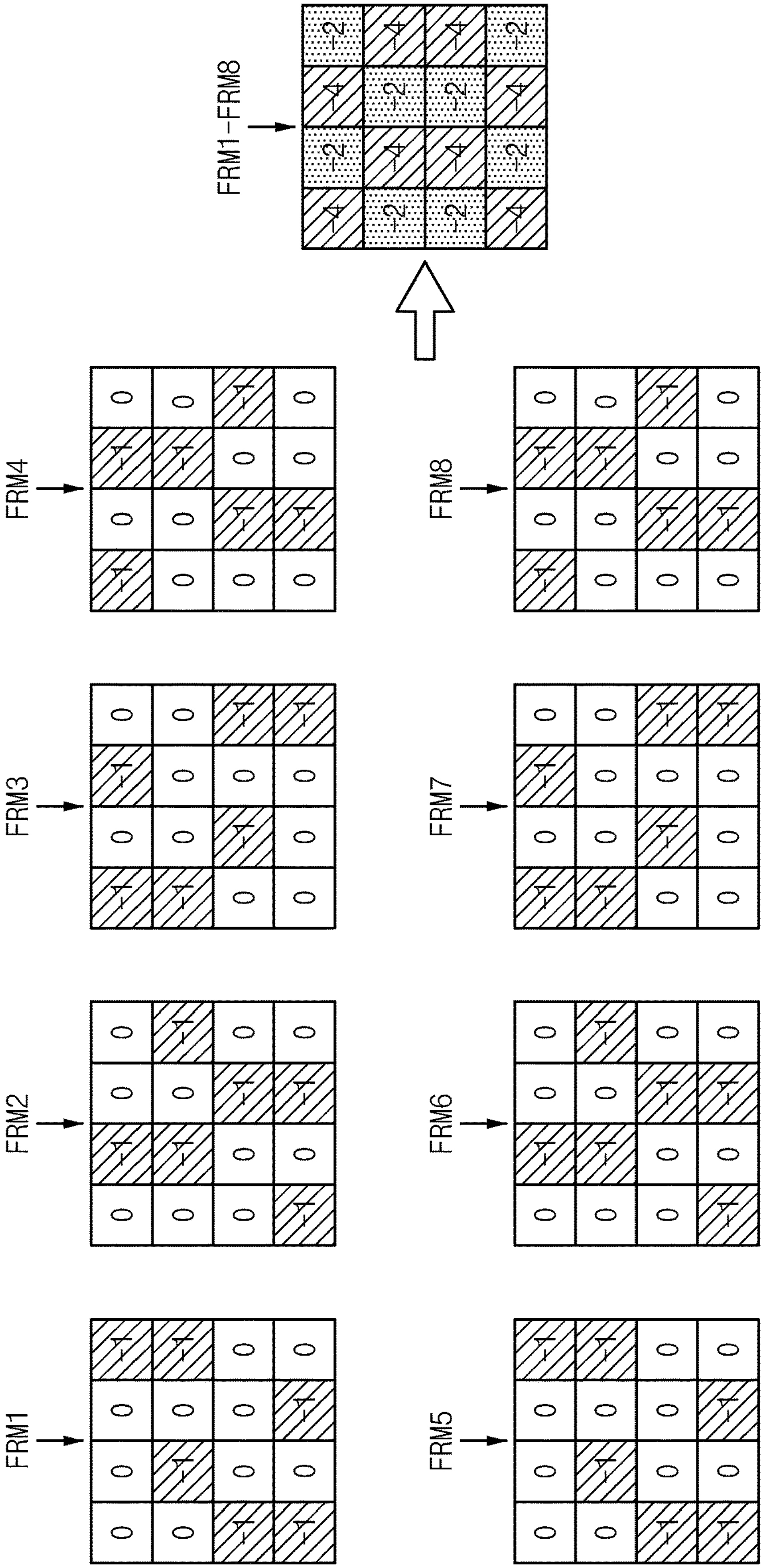
Figure 8:
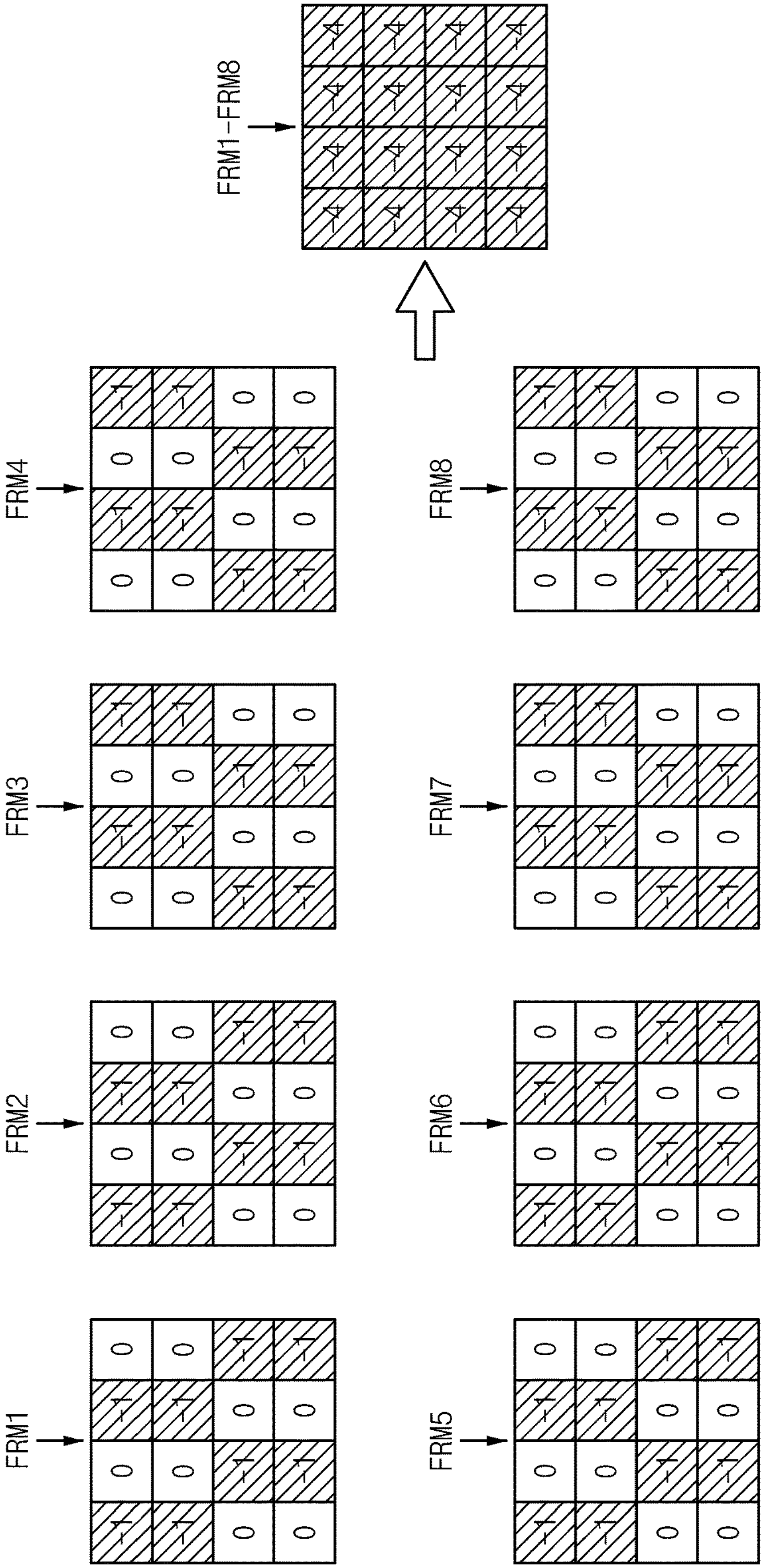

FIG. 3 is a block diagram illustrating a global current manager 300 according to an embodiment. The global current manager 300 in FIG. 3 represents an example of the global current manager 140 of FIG. 1.

Referring to FIG. 3, a global current manager 300 may include a reference current generator 310, a reference voltage generator 320, a comparator which includes a current comparator 330 and a voltage comparator 340, a compensation voltage generator 350, and a compensation data generator 360.

The reference current generator 310 may generate a reference current range RCR based on the image data IMD1. The reference current range RCR may include a minimum reference current mRC and a maximum reference current MRC corresponding to the grayscale values of the image data IMD1. The minimum reference current mRC may be the minimum value of the global current flowing through the pixels PX when the pixels PX emit light based on the data signals DS corresponding to the grayscale values of the image data IMD1. The maximum reference current MRC may be the maximum value of the global current flowing through the pixels PX when the pixels PX emit light based on the data signals DS corresponding to the grayscale values of the image data IMD1. The reference current generator 310 may include a first lookup table in which reference current ranges corresponding to all grayscale values of image data are stored. The reference current generator 310 may select a reference current range RCR corresponding to the grayscale values of the image data IMD1 from the first lookup table.

The reference voltage generator 320 may generate a minimum reference voltage mRV based on the image data IMD1. The minimum reference voltage mRV may be the minimum value of the driving voltage ELVDD for the pixels PX to normally emit light when the pixels PX emit light based on the data signals DS corresponding to the grayscale values of the image data IMD1. The reference voltage generator 320 may include a second lookup table in which minimum reference voltages corresponding to all grayscale values of image data are stored. The reference voltage generator 320 may select a minimum reference voltage mRV corresponding to the grayscale values of the image data IMD1 from the second lookup table.

The current comparator 330 may compare the sensing current I_SEN sensed by the current sensor 150 and the reference current range RCR received from the reference current generator 310, and may generate a comparison result (first comparison result, CPR1) based on the sensing current I_SEN and the reference current range RCR. The first comparison result CPR1 may include a case in which the sensing current I_SEN is greater than the maximum reference current MRC, a case in which the sensing current I_SEN is less than the minimum reference current mRC, and a case in which the sensing current I_SEN is greater than or equal to the minimum reference current mRC and less than or equal to the maximum reference current MRC.

The voltage comparator 340 may compare the sensing driving voltage ELVDD_S and the minimum reference voltage mRV, and may generate a comparison result (second comparison result, CPR2) based on the sensing driving voltage ELVDD_S received from the voltage sensor 160 and the minimum reference voltage mRV received from the reference voltage generator 320. The second comparison result CPR2 may include a case in which the sensing driving voltage ELVDD_S is greater than or equal to the minimum reference voltage mRV and a case in which the sensing driving voltage ELVDD_S is less than the minimum reference voltage mRV.

The compensation voltage generator 350 may generate the compensation voltage CPV for controlling the voltage generator to alter the driving voltage ELVDD based on the first comparison result CPR1 and the second comparison result CPR2. The compensation voltage generator 350 may generate the compensation voltage CPV (e.g., a voltage less than 0 V) for decreasing the driving voltage ELVDD when the sensing current I_SEN is greater than the maximum reference current MRC and the sensing driving voltage ELVDD_S is greater than or equal to the minimum reference voltage mRV.

FIG. 4 is a table for describing the compensation voltage CPV and the driving voltage ELVDD in frames according to an embodiment.

Referring to FIG. 4, in an embodiment, the compensation voltage generator 350 may generate a negative compensation voltage (CPV having a voltage less than 0 V, for example, —a V, where 'a' is a positive real number) when the sensing current I_SEN is greater than the maximum reference current MRC and the sensing driving voltage ELVDD_S is greater than or equal to the minimum reference voltage mRV. In an embodiment, the compensation voltage CPV may be −0.1 V. The voltage generator 130 may decrease the driving voltage ELVDD by adding the compensation voltage CPV to the driving voltage ELVDD every predetermined frames (e.g., 10 frames). For example, when the driving voltage ELVDD is 24 V in an $N^{th}$ frame (N is a natural number greater than or equal to 1), the driving voltage ELVDD may decrease from 24 V to 23.9 V in an N+10th frame, the driving voltage ELVDD may decrease to 23.8 V in an $N+20^{th}$ frame, and the driving voltage ELVDD may decrease to 23.7 V in the $N+30^{th}$ frame. Accordingly, when the sensing current I_SEN is greater than the maximum reference current MRC and the sensing driving voltage ELVDD_S is greater than or equal to the minimum reference voltage mRV, the driving voltage ELVDD may gradually (e.g., linearly) decrease.

In a conventional art, when the sensing current I_SEN is greater than the maximum reference current MRC, all grayscale values of the image data IMD1 may be decreased to decrease the global current of the display device 100. Since all grayscale values of the image data IMD1 are decreased in the conventional art, a change in luminance of the display device 100 may increase, and flicker may be recognized.

In the embodiment of the present disclosure, when the sensing current I_SEN is greater than the maximum reference current MRC and the sensing driving voltage ELVDD_S is greater than or equal to the minimum reference voltage mRV, the driving voltage ELVDD may be gradually decreased to decrease the global current of the display device 100. Since the driving voltage ELVDD is gradually decreased in the embodiment of the present disclosure, the change in luminance of the display device 100 between adjacent frames may decrease, and flicker may not be recognized.

The compensation voltage generator 350 may generate a positive compensation voltage (CPV having a voltage greater than 0 V, for example +a V, where 'a' is a positive real number) for increasing the driving voltage ELVDD or the compensation voltage CPV for maintaining the driving voltage ELVDD (e.g., 0 V) when the sensing current I_SEN is greater than the maximum reference current MRC and the sensing driving voltage ELVDD_S is less than the minimum reference voltage mRV.

The compensation data generator 360 may generate the compensation data CPD for controlling the grayscale values of the image data IMD1 in a dithering method based on the first comparison result CPR1 and the second comparison result CPR2. The compensation data generator 360 may generate the compensation data CPD for maintaining the grayscale values of the image data IMD1 or the compensation data CPD for decreasing the grayscale values of the image data IMD1 in the dithering method when the sensing current I_SEN is greater than the maximum reference current MRC and the sensing driving voltage ELVDD_S is greater than or equal to the minimum reference voltage mRV.

The compensation data generator 360 may generate the compensation data CPD for decreasing the grayscale values of the image data IMD1 in the dithering method when the sensing current I_SEN is greater than the maximum reference current MRC and the sensing driving voltage ELVDD_S is less than the minimum reference voltage mRV.

FIGS. 5, 6, 7, and 8 are diagrams for describing the compensation data CPD in frames according to embodiments. FIGS. 5 to 8 may illustrate compensation values of the compensation data CPD corresponding to pixels arranged in four rows and four columns in first to eighth frames FRM1 to FRM8.

Referring to FIGS. 5 to 8, the compensation data generator 360 may generate the compensation data CPD in the dithering method during predetermined frames when the sensing current I_SEN is greater than the maximum reference current MRC and the sensing driving voltage ELVDD_S is less than the minimum reference voltage mRV. In the embodiment illustrated in FIG. 5, accumulated compensation values corresponding to the pixels for 8 frames may be −1, and in the embodiment illustrated in FIG. 6, accumulated compensation values corresponding to the pixels for 8 frames may be −2. In the embodiment illustrated in FIG. 7, accumulated compensation values corresponding to the pixels for 8 frames may be −2 or −4, and in the embodiment illustrated in FIG. 8, accumulated compensation values corresponding to the pixels for 8 frames may be −4. The timing controller 123 may decrease the grayscale values of the image data IMD1 by adding the compensation values of the compensation data CPD to the grayscale values of the image data IMD1 of a portion of the pixels for each frame. In the embodiment illustrated in FIG. 5, the grayscale values of the image data IMD1 may decrease by 1 during 8 frames, and in the embodiment illustrated in FIG. 6, the grayscale values of the image data IMD1 may decrease by 2 during 8 frames. In the embodiment illustrated in FIG. 7, the grayscale values of the image data IMD1 may decrease by 2 or 4 during 8 frames, and in the embodiment illustrated in FIG. 8, the grayscale values of the image data IMD1 may decrease by 4 during 8 frames. Accordingly, when the sensing current I_SEN is greater than the maximum reference current MRC and the sensing driving voltage ELVDD_S is less than the minimum reference voltage mRV, the grayscale values of the image data IMD1 may be decreased step by step.

In an embodiment of the present disclosure, when the sensing current I_SEN is greater than the maximum reference current MRC and the sensing driving voltage ELVDD_S is less than the minimum reference voltage mRV, the grayscale values of the image data IMD1 may be decreased in the dithering method by decreasing the gray scale values of the image data IMD1 in only a portion of the pixels at a time to decrease the global current of the display device 100. In the embodiment, since the grayscale values of the image data IMD1 are decreased in the dithering method, a change in luminance of the display device 100 between adjacent frames may decrease, and flicker may not be recognized.

The compensation data generator 360 may generate the compensation data CPD for increasing the grayscale values of the image data IMD1 in the dithering method when the sensing current I_SEN is less than the minimum reference current mRC. Accordingly, when the sensing current I_SEN is less than the minimum reference current mRC, the grayscale values of the image data IMD1 may increase step by step.

The compensation data generator 360 may generate the compensation data CPD for maintaining the grayscale values of the image data IMD1 when the sensing current I_SEN is greater than or equal to the minimum reference current mRC and less than or equal to the maximum reference current MRC. For example, the compensation values of the compensation data CPD may be 0.

Figure 9:
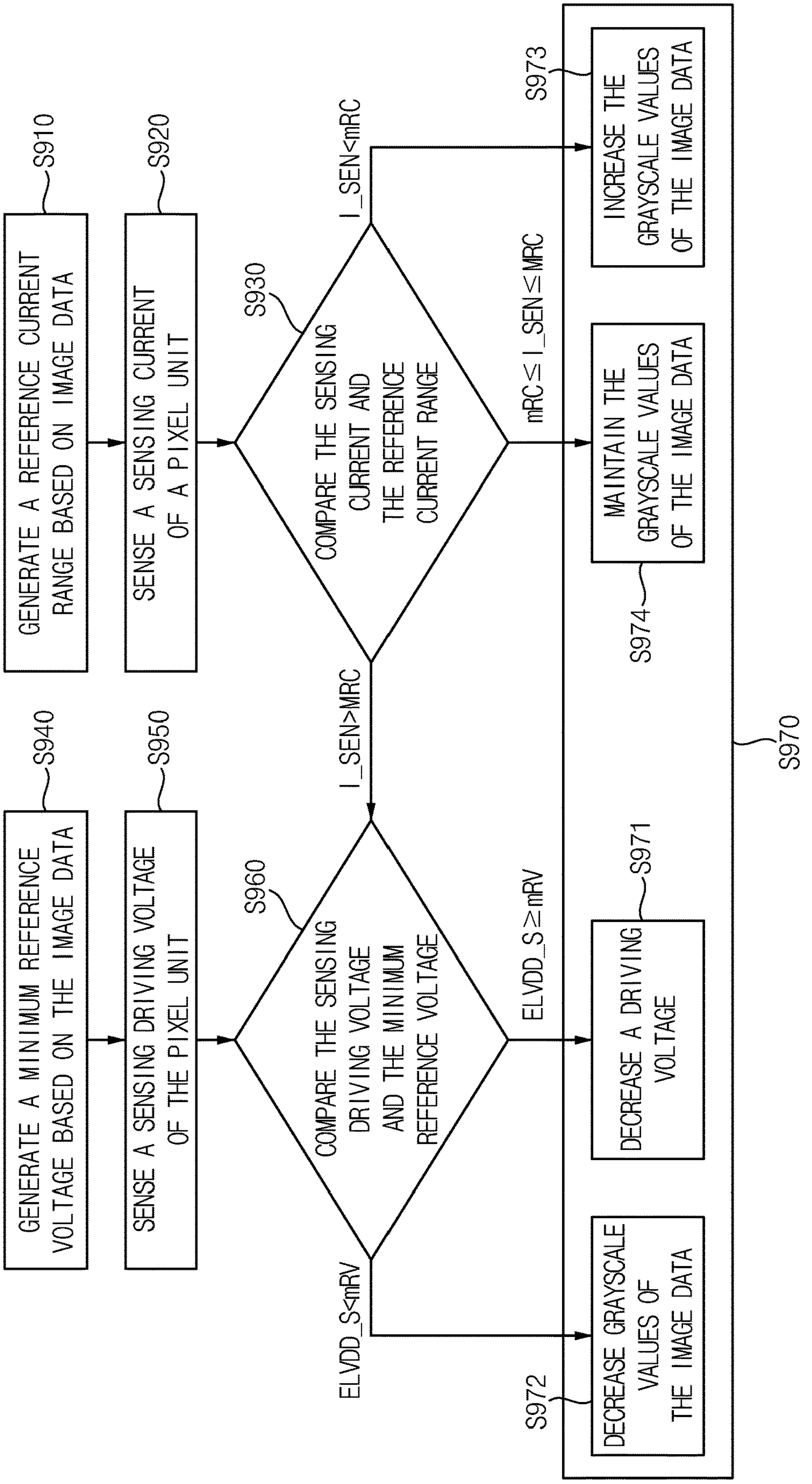
FIG. 9 is a flowchart illustrating a method of driving a display device according to an embodiment.

FIG. 9 is a flowchart illustrating a method of driving a display device according to an embodiment.

Referring to FIG. 9, in a method of driving a display device, a reference current range RCR may be generated based on image data IMD1 (S910). The reference current range RCR may include a minimum reference current mRC and a maximum reference current MRC corresponding to grayscale values of the image data IMD1. A sensing current I_SEN of a pixel unit 110 may be sensed (S920). The sensing current I_SEN and the reference current range RCR may be compared (S930).

A minimum reference voltage mRV may be generated based on the image data IMD1 (S940). A sensing driving voltage ELVDD_S of the pixel unit 110 may be sensed (S950). The sensing driving voltage ELVDD_S and the minimum reference voltage mRV may be compared (S960).

Based on a comparison result between the sensing current I_SEN and the reference current range RCR and a comparison result between the sensing driving voltage ELVDD_S and the minimum reference voltage mRV, a driving voltage ELVDD may be controlled, or the grayscale values of the image data IMD1 may be controlled in a dithering method (S970).

When the sensing current I_SEN is greater than the maximum reference current MRC and the sensing driving voltage ELVDD_S is greater than or equal to the minimum reference voltage mRV, the driving voltage ELVDD may be decreased (S971). Further, along with the decrease of the driving voltage ELVDD, the grayscale values of the image data IMD1 may be maintained, or the grayscale values of the image data IMD1 may be decreased in the dithering method.

When the sensing current I_SEN is greater than the maximum reference current MRC and the sensing driving voltage ELVDD_S is less than the minimum reference voltage mRV, the grayscale values of the image data IMD1 may be decreased in the dithering method (S972). Further, along with the decrease of the grayscale values of the image data IMD1 in the dithering method, the driving voltage ELVDD may be increased or maintained.

When the sensing current I_SEN is less than the minimum reference current mRC, the grayscale values of the image data IMD1 may be increased in the dithering method (S973).

When the sensing current I_SEN is greater than or equal to the minimum reference current mRC and less than or equal to the maximum reference current MRC, the grayscale values of the image data IMD1 may be maintained (S974).

Figure 10:
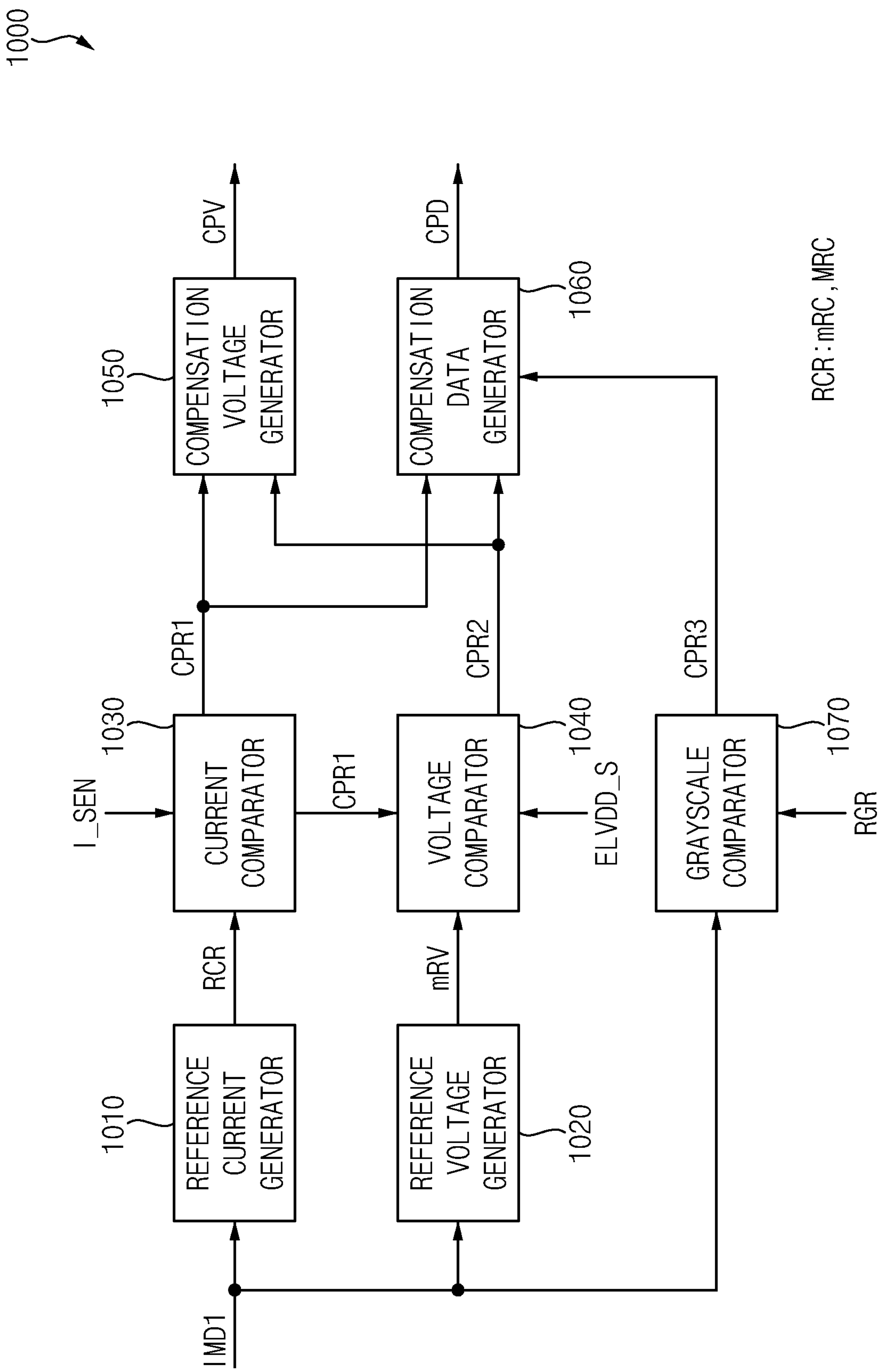
FIG. 10 is a block diagram illustrating a global current manager according to an embodiment.

FIG. 10 is a block diagram illustrating a global current manager 1000 according to an embodiment. The global current manager 1000 in FIG. 10 represents an example of the global current manager 140 in FIG. 1.

Referring to FIG. 10, a global current manager 1000 may include a reference current generator 1010, a reference voltage generator 1020, a current comparator 1030, a voltage comparator 1040, a compensation voltage generator 1050, a compensation data generator 1060, and a grayscale comparator 1070. The global current manager 1000 described with reference to FIG. 10 may be substantially the same as or similar to the global current manager 300 described with reference to FIG. 3 except for further including the grayscale comparator 1070. Accordingly, descriptions of repeated components will be omitted.

The grayscale comparator 1070 may compare an average of the grayscale values of the image data IMD1 and a preset reference grayscale RGR, and may generate a comparison result (third comparison result, CPR3) between the average of the grayscale values of the image data IMD1 and the reference grayscale RGR. The third comparison result CPR3 may include a case in which the average of the grayscale values of the image data IMD1 is greater than or equal to the reference grayscale value RGR and a case in which the average of the grayscale values of the image data IMD1 is less than the reference grayscale value RGR. The reference grayscale RGR may be a maximum grayscale at which a change in luminance of the display device 100 according to a change in grayscale values of the image data IDM1 is not recognized by a user. In an embodiment, when a grayscale range includes 0 to 255 grayscales, the reference grayscale RGR may be 127 grayscale.

The compensation data generator 1060 may generate the compensation data CPD for controlling the grayscale values of the image data IMD1 based on the first comparison result CPR1, the second comparison result CPR2, and the third comparison result CPR3. The compensation data generator 1060 may generate the compensation data CPD for controlling the grayscale values of the image data IMD1 in the dithering method when the average of the grayscale values of the image data IMD1 is greater than or equal to the reference grayscale value PGR.

The compensation data generator 1060 may generate the compensation data CPD for controlling the grayscale values of the image data IMD1 in a non-dithering method when the average of the grayscale values of the image data IMD1 is less than the reference grayscale RGR. The non-dithering method may be a method in which all grayscale values of the image data IMD1 are decreased or increased at the same time.

Figure 11:
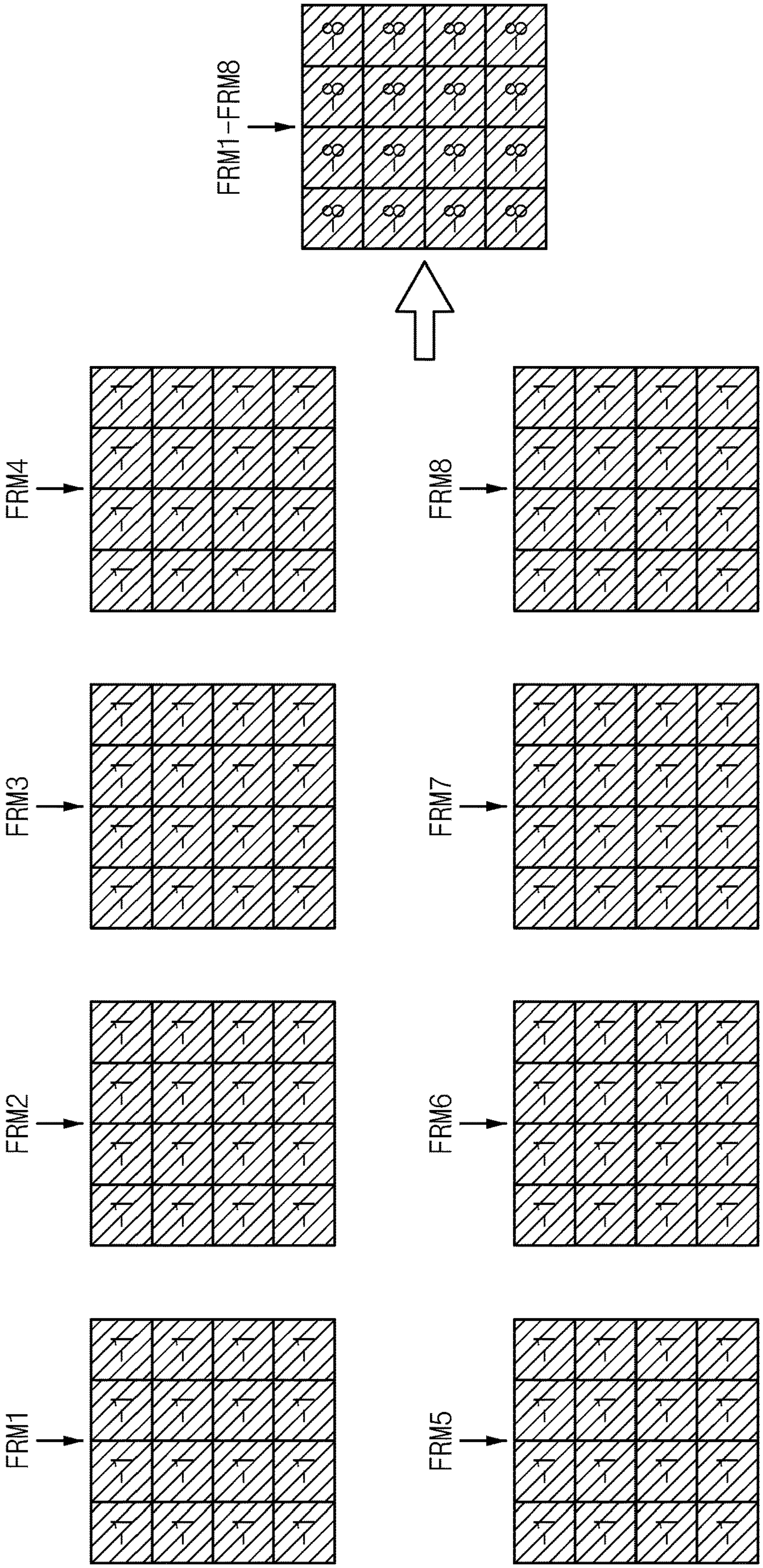
FIG. 11 is a diagram for describing compensation data in frames according to an embodiment.

FIG. 11 is a diagram for describing compensation data in frames according to an embodiment. FIG. 11 may illustrate compensation values of the compensation data CPD corresponding to pixels arranged in four rows and four columns during first to eighth frames FRM1 to FRM8.

Referring to FIG. 11, the compensation data generator 1060 may generate the compensation data CPD in the non-dithering method when the average of the grayscale values of the image data IMD1 is less than the reference grayscale RGR. In the embodiment illustrated in FIG. 11, when the sensing current I_SEN is greater than the maximum reference current MRC, the compensation values corresponding to the pixels for each frame may be −1, and accumulated compensation values corresponding to the pixels during 8 frames may be −8. The timing controller 123 may decrease the grayscale values of the image data IMD1 by adding the compensation values of the compensation data CPD to the grayscale values of the image data IMD1 for each frame. In the embodiment illustrated in FIG. 11, the grayscale values of the image data IMD1 may decrease by 1 for each frame, and the grayscale values of the image data IMD1 may decrease by 8 during 8 frames.

In an embodiment of the present disclosure, when the average of the grayscale values of the image data IMD1 is less than the reference grayscale RGR, the grayscale values of the image data IMD1 may be controlled in the non-dithering method to control the global current the display device 100. In the embodiment, although the grayscale values of the image data IMD1 are controlled in the non-dithering method, since the average of the grayscale values of the image data IMD1 is less than the reference grayscale RGR, a change in luminance of the display device 100 may not be recognized, and flicker may not be recognized by the user.

Figure 12:
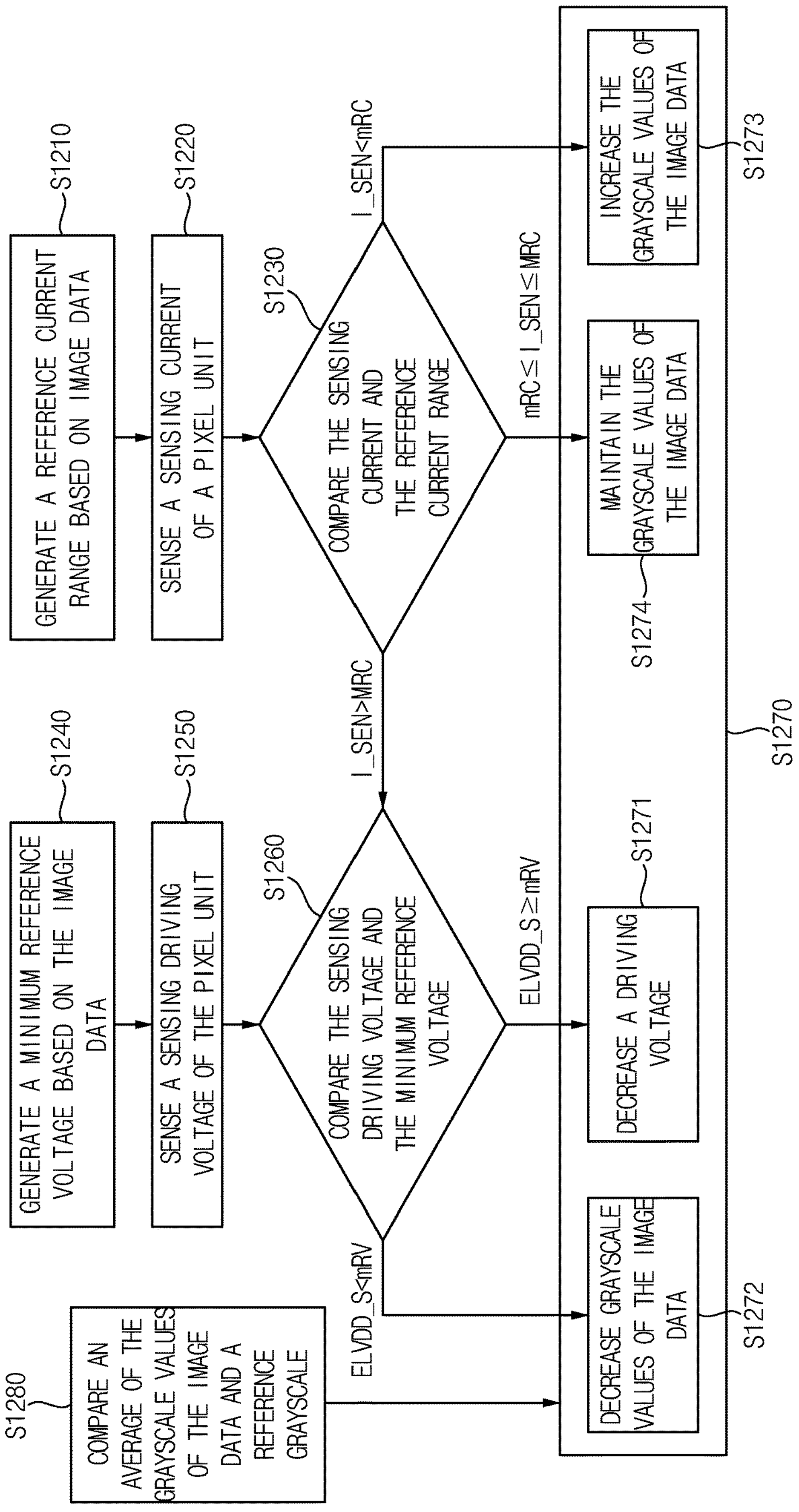
FIG. 12 is a flowchart illustrating a method of driving a display device according to an embodiment.

FIG. 12 is a flowchart illustrating a method of driving a display device according to an embodiment. The method of driving the display device described with reference to FIG. 12 may be substantially the same as or similar to the method of driving the display device with reference to FIG. 9 except for further including comparing an average of grayscale values of image data and a reference grayscale. Accordingly, descriptions of repeated steps may be omitted.

Referring to FIG. 12, an average of the grayscale values of the image data IMD1 and a preset reference grayscale RGR may be compared (S1280).

Based on the comparison result between the sensing current I_SEN and the reference current range RCR, the comparison result between the sensing driving voltage ELVDD_S and the minimum reference voltage mRV, and the comparison result between the average of the grayscale values of the image data IMD1 and the reference grayscale RGR, the driving voltage ELVDD may be controlled, or the grayscale values of the image data IMD1 may be controlled (S1270).

In the decrease or increase of the grayscale values of the image data IMD1, when the average of the grayscale values of the image data IMD1 is greater than or equal to the reference grayscale RGR, the grayscale values of the image data IMD1 may be decreased or increased in a dithering method. In the decrease or increase of the grayscale values of the image data IMD1, when the average of the grayscale values of the image data IMD1 is less than the reference grayscale RGR, all grayscale values of the image data IMD1 may be decreased or increased in a non-dithering method.

Figure 13:
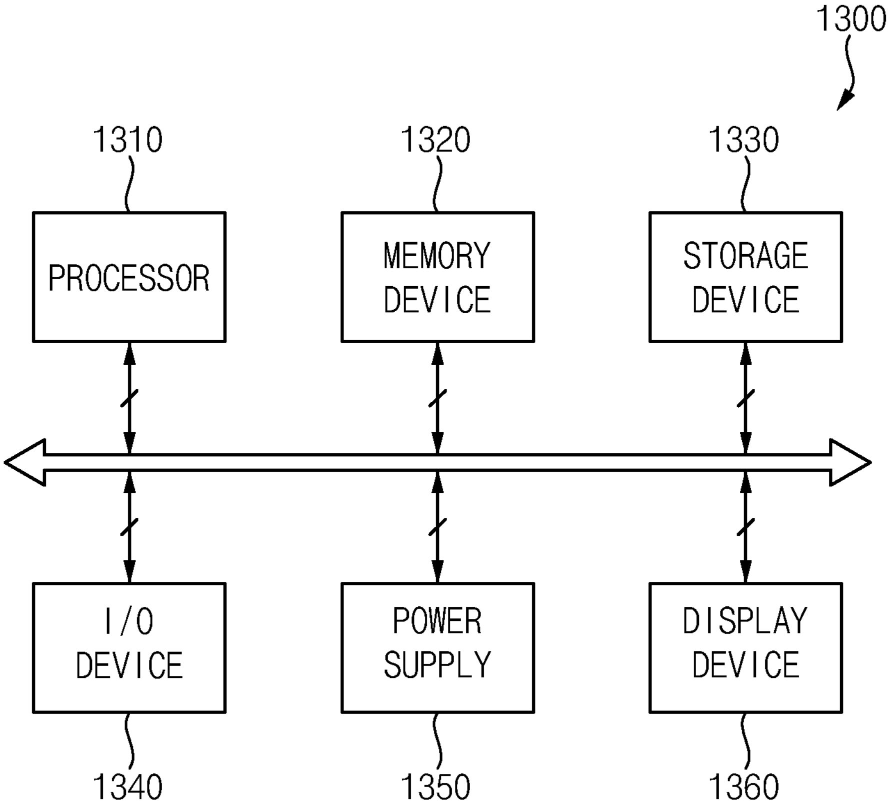
FIG. 13 is a block diagram illustrating an electronic apparatus including a display device according to an embodiment.

FIG. 13 is a block diagram illustrating an electronic apparatus 1300 including a display device 1360 according to an embodiment.

Referring to FIG. 13, the electronic apparatus 1300 may include a processor 1310, a memory device 1320, a storage device 1330, an input/output ("I/O") device 1340, a power supply 1350, and a display device 1360. The electronic apparatus 1300 may further include a plurality of ports for communicating with a video card, a sound card, a memory card, a universal serial bus ("USB") device, etc.

The processor 1310 may perform particular calculations or tasks. In an embodiment, the processor 1310 may be a microprocessor, a central processing unit ("CPU"), or the like. The processor 1310 may be coupled to other components via an address bus, a control bus, a data bus, or the like. In an embodiment, the processor 1310 may be coupled to an extended bus such as a peripheral component interconnection ("PCI") bus.

The memory device 1320 may store data for operations of the electronic apparatus 1100. In an embodiment, the memory device 1320 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1330 may include a solid state drive ("SSD") device, a hard disk drive ("HDD") device, a CD-ROM device, or the like. The I/O device 1340 may include an input device such as a keyboard, a keypad, a touchpad, a touch-screen, a mouse device, etc., and an output device such as a speaker, a printer, etc. The power supply 1350 may supply a power required for the operation of the electronic apparatus 1300. The display device 1360 may be coupled to other components via the buses or other communication links.

In the display device 1360, a global current may be controlled by decreasing a driving voltage or decreasing or increasing grayscale values of image data in a dithering method, so that a change in luminance of the display device 1360 may decrease in the process of controlling the global current. Accordingly, flicker may not be recognized, and display quality of the display device 1360 may be improved.

The display device according to the embodiments may be applied to a display device included in an electronic apparatus such as a computer, a notebook, a mobile phone, a smart phone, a smart pad, a PMP, a PDA, an MP3 player, or the like.

Although the display devices and the methods of driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:
- a pixel unit which includes pixels;
- a driver which drives the pixel unit based on image data;
- a voltage generator which provides a driving voltage to the pixel unit; and
- a global current manager including a compensation voltage generator which receives a comparison result between a sensing current of the pixel unit and a reference current range generated based on the image data from a comparator and generates a compensation voltage for controlling the driving voltage, and a compensation data generator which generates compensation data for controlling grayscale values of the image data in a dithering method based on the comparison result.

2. The display device of claim 1, wherein the global current manager generates the compensation voltage for decreasing the driving voltage or generates the compensation data for decreasing the grayscale values of the image data in the dithering method when the sensing current is greater than a maximum reference current of the reference current range.

3. The display device of claim 2, wherein the global current manager generates the compensation voltage for decreasing the driving voltage when a sensing driving voltage of the pixel unit is greater than or equal to a minimum reference voltage generated based on the image data.

4. The display device of claim 3, wherein the global current manager generates the compensation data for maintaining the grayscale values of the image data when the sensing driving voltage is greater than or equal to the minimum reference voltage.

5. The display device of claim 3, wherein the global current manager generates the compensation data for decreasing the grayscale values of the image data in the dithering method when the sensing driving voltage is greater than or equal to the minimum reference voltage.

6. The display device of claim 3, wherein the global current manager generates the compensation data for decreasing the grayscale values of the image data in the dithering method when the sensing driving voltage is less than the minimum reference voltage.

7. The display device of claim 6, wherein the global current manager generates the compensation voltage for increasing the driving voltage when the sensing driving voltage is less than the minimum reference voltage.

8. The display device of claim 6, wherein the global current manager generates the compensation voltage for maintaining the driving voltage when the sensing driving voltage is less than the minimum reference voltage.

9. The display device of claim 1, wherein the global current manager generates the compensation data for increasing the grayscale values of the image data in the dithering method when the sensing current is less than a minimum reference current of the reference current range.

10. The display device of claim 1, wherein the global current manager generates the compensation data for controlling the grayscale values of the image data in the dithering method when an average of the grayscale values of the image data is greater than or equal to a preset reference grayscale, and wherein the global current manager generates the compensation data for controlling the grayscale values of the image data in a non-dithering method when the average of the grayscale values of the image data is less than the reference grayscale.

11. A method of driving a display device, the method comprising:

generating a reference current range based on image data;

sensing a sensing current of a pixel unit including pixels;

comparing the sensing current and the reference current range; and controlling a driving voltage provided to the pixel unit based on a comparison result between the sensing current and the reference current range, or controlling grayscale values of the image data in a dithering method based on the comparison result.

12. The method of claim 11, wherein controlling the driving voltage or controlling the grayscale values of the image data in the dithering method includes decreasing the driving voltage or decreasing the grayscale values of the image data in the dithering method when the sensing current is greater than a maximum reference current of the reference current range.

13. The method of claim 12, further comprising:

generating a minimum reference voltage based on the image data;

sensing a sensing driving voltage of the pixel unit; and comparing the sensing driving voltage and the minimum reference voltage, wherein controlling the driving voltage or controlling the grayscale values of the image data in the dithering method includes decreasing the driving voltage when the sensing driving voltage is greater than or equal to the minimum reference voltage.

14. The method of claim 13, wherein, in decreasing the driving voltage, the grayscale values of the image data are maintained.

15. The method of claim 13, wherein, in decreasing the driving voltage, the grayscale values of the image data are decreased in the dithering method.

16. The method of claim 13, wherein controlling the driving voltage or controlling the grayscale values of the image data in the dithering method includes decreasing the grayscale values of the image data in the dithering method when the sensing driving voltage is less than the minimum reference voltage.

17. The method of claim 16, wherein, in decreasing the grayscale values of the image data in the dithering method, the driving voltage is increased.

18. The method of claim 16, wherein, in decreasing the grayscale values of the image data in the dithering method, the driving voltage is maintained.

19. The method of claim 11, wherein controlling the driving voltage or controlling the grayscale values of the image data in the dithering method includes increasing the grayscale values of the image data in the dithering method when the sensing current is less than a minimum reference current of the reference current range.

20. The method of claim 11, further comprising:

comparing an average of the grayscale values of the image data and a preset reference grayscale;

wherein the grayscale values of the image data are decreased in the dithering method when the average of the grayscale values of the image data is greater than or equal to the reference grayscale, and wherein the grayscale values of the image data are decreased in a non-dithering method when the average of the grayscale values of the image data is less than the reference grayscale.

* * * * *